Nov. 11, 1924.  
W. O. MEISSNER  
1,515,309  
WIRE WINDING MACHINE  
Filed Aug. 10, 1922  
3 Sheets-Sheet 2
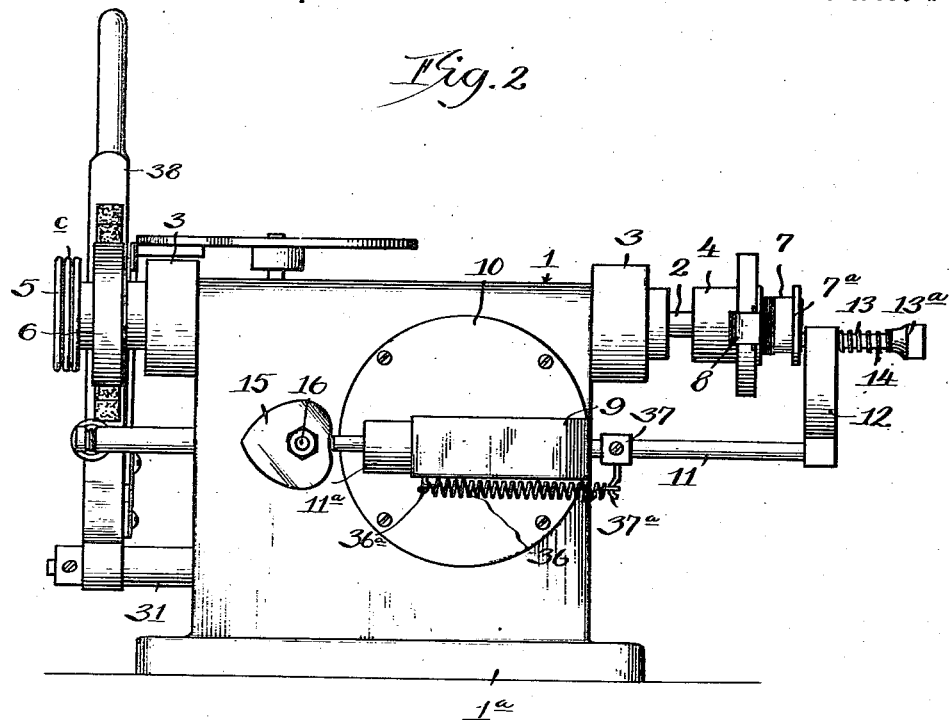
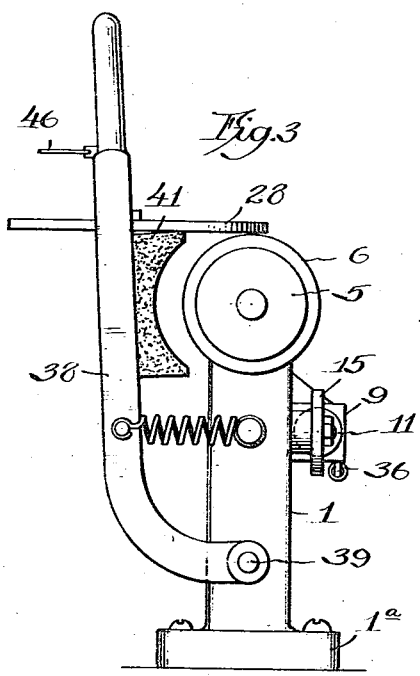
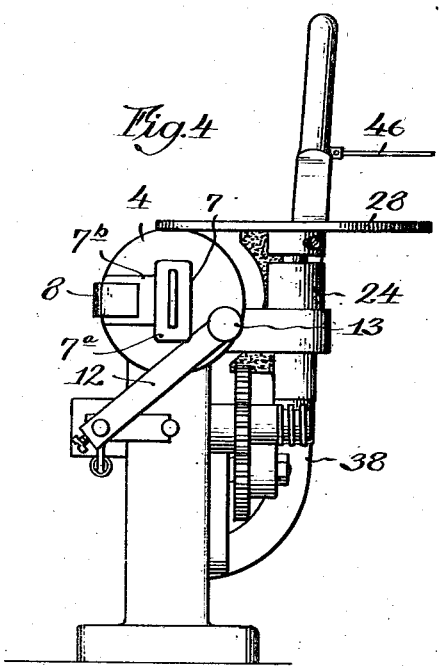
Inventor  
William O. Meissner Nov. 11, 1924.  
W. O. MEISSNER  
WIRE WINDING MACHINE  
Filed Aug. 10, 1922  
1,515,309  
3 Sheets-Sheet 3
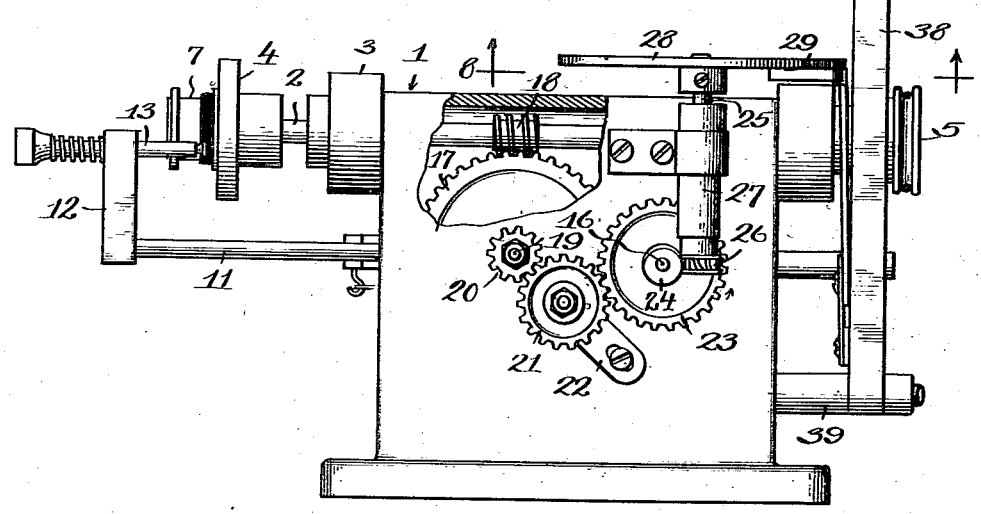
Fig.5
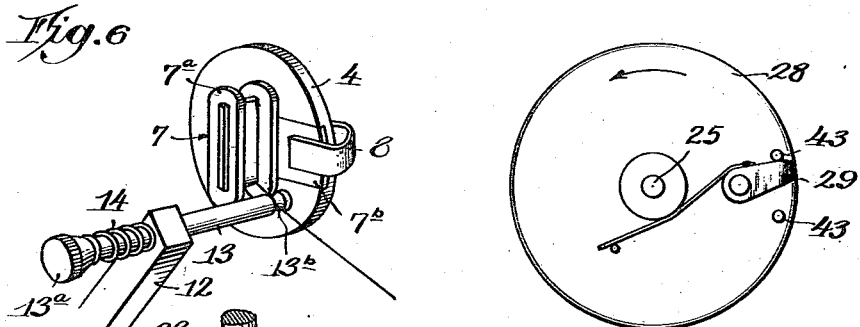
Fig.6
Fig.8
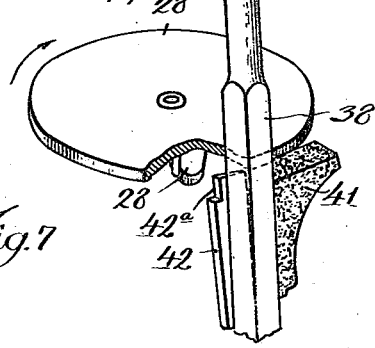
Fig.7
Inventor,  
William O. Meissner,  
By Offield, Poole, Hunter & Scott Attys.

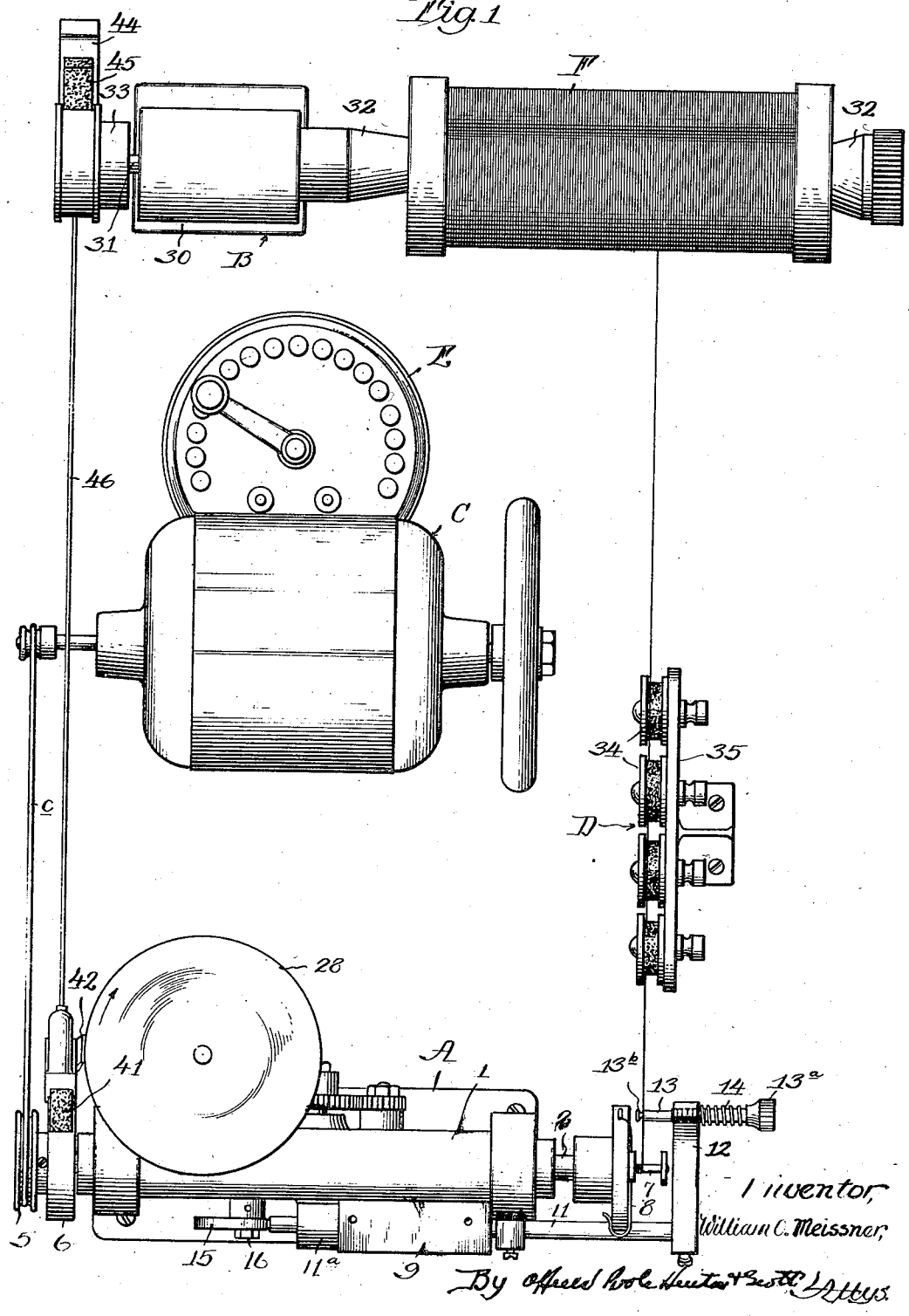

Patented Nov. 11, 1924.

1,515,309

UNITED STATES PATENT OFFICE.

WILLIAM O. MEISSNER, OF CHICAGO, ILLINOIS, ASSIGNOR TO MEISSNER MANUFACTURING COMPANY, OF CHICAGO, ILLINOIS, A CORPORATION OF ILLINOIS.

WIRE-WINDING MACHINE.

Application filed August 10, 1922. Serial No. 580,833.

*To all whom it may concern:*

Be it known that I, WILLIAM O. MEISSNER, a citizen of the United States, and a resident of Chicago, in the county of Cook and State of Illinois, have invented certain new and useful Improvements in Wire-Winding Machines, of which the following is a specification.

This invention relates to improvements in wire winding machines, and more particularly to a motor driven machine for winding bobbins. The primary object of the invention is to provide a construction for a winding machine embodying improved features calculated to increase production, promote more perfect results, and to eliminate the imperfections in the winding.

An example of the class of work which the machine is especially designed to perform is the winding of small coils for electrical apparatus, the particular coil herein illustrated being of the type and size as is used in telephone receivers. Uniformity in winding and accuracy in the number of turns of wire in each coil, not to mention speed of winding and freedom from wire breakage, are desirable features sought to be accomplished. Important features are, therefore, the automatic feed to the bobbin, and mechanism for indicating, as well as automatically stopping the machine when the required number of turns have been applied to each bobbin. These features and others are fully set forth herein, reference being had to the accompanying drawings, in which:

Figure 1 is a plan view of the complete machine showing the general arrangement of the parts, Figure 2 is a view in front elevation of the winding machine proper, Figure 3 is a view in elevation of the power end of the winding machine proper, Figure 4 is a similar view of the bobbin end of the machine, Figure 5 is a view in rear elevation of the machine, Figure 6 is a perspective view of the bobbin holding disc and wire feeding mechanism, Figure 7 is a perspective view of the tripping and brake mechanism, and Figure 8 is a bottom view of the disc of the tripping mechanism.

As arranged in the disclosure of Figure 1, the complete machine comprises the winding machine proper A, a spool rack B, a motor C and friction discs D. The machine A is driven through a belt $c$ from the motor C, the speed of which is controlled by a simple form of rheostat E. The spool rack B is located at a distance from and parallel to the winding machine proper A, and supports a spool of wire F from which the wire is unwound and fed to the winding end of the machine through the feed rollers D.

The machine proper comprises a vertical casing 1, having an integral base plate $1^a$ which is screwed down to the top of a table or bench, at which the operator sits. Journalled in the upper portion of the casing 1 is a horizontal spindle 2 running in ball bearings mounted in housings 3—3, at the opposite ends of the casing. The spindle projects from opposite ends of the casing, and has mounted at one (right) end, (Figure 2), a bobbin holding disc 4, and at its extreme opposite end a grooved drive pulley 5. Between the pulley 5 and the adjacent end of the casing is mounted a brake pulley 6, coacting in brake mechanism hereinafter to be described.

The bobbin disc 4 is a circular plate, its outer face suitably prepared to receive a bobbin 7, which in this instance has a spool-like portion $7^a$ projecting centrally and at right angles to the face of the disc, and a stem or flange $7^b$ which fits in a radial slot cut in the disc. A clip 8 fits over the edge of the disc and the flange $7^b$, thus removably clamping the bobbin in place. It is understood that the bobbin 7 is merely one form that may be mounted on the disc.

On the front side of the casing 1 is a horizonal bearing sleeve 9, preferably secured to a circular cover plate 10, permitting access to the interior of the casing. This sleeve slidably supports a reciprocating feed bar 11 having an enlarged bearing portion $11^a$ which travels in the sleeve 9. The feed bar extends to the right (Figure 2) beyond the end of the casing and terminates below the bobbin disc 4. A radial arm 12 is fixed to the end of the bar and extends upwardly to a point rearwardly of and at the level of the bobbin 7. In the end of the arm 12 is an endwise adjustable rod 13 having a head $13^a$ at its outer end, and a coil spring 14 bearing at its ends against the head and the arm 12. At its inner end of the rod 13 is cut a groove 13ᵇ which serves as a guide for the wire as it is wound onto the bobbin in the manner hereinafter to be described.

In horizontal alignment with the feed rod 11 and located just beyond its opposite end is a heart-shaped cam 15 mounted upon a shaft 16 extending through the front wall of the casing and driven by parts hereinafter described.

Mounted within the casing 1 is a large worm wheel 17 (Figure 5) which meshes with a worm 18, fixed to the spindle 2. The shaft 19 of the worm wheel carries a small pinion 20 located exterior of the casing, which meshes with a gear wheel 21 forming the intermediate gear member of a reduction gear train, said gear wheel being journalled on an adjustable journal support 22, whereby gears of different sizes may be substituted. The intermediate gear wheel meshes with a third gear wheel 23 fixed to the shaft 16, which extends through the casing and carries at its opposite end the cam 15 hereinbefore described. This shaft also carries a small worm pinion 24 which drives a vertical shaft 25 through a worm wheel 26 mounted at its lower end. The shaft 25 rotates in a bearing sleeve 27, mounted to the casing 1, the upper end of the shaft projecting above the top of the casing. A disc 28 is fixed to the end of the shaft, and has secured to its under side a lug 29 located at its periphery, and acting as a trip for the braking device presently to be described.

The spool rack B consists of a stationary vertical standard 30 (Figure 1) which supports a spindle 31 in a bearing at its upper end. The spool F is mounted on the spindle, there being tapered collars 32—32 which fit in the ends of the spool, and frictionally hold the same from turning on the spindle, the outermost collar being threaded on the spindle. At the other side of the standard 30 there is fixed to the spindle a small pulley or brake drum 33. In Figure 1, the strand of wire f is fed from the spool F through the friction discs D, consisting of a series of felt discs 34 mounted upon a supporting frame 35. These discs are arranged in a horizontal line between the spool and the winding end of the machine, the wire passing alternately over and under the discs and thence over the grooved end 13ᵇ of the reciprocating guide bar 13 to the bobbin 7.

The winding operation consists in applying a bobbin to the disc 6, threading the wire around the bobbin, and then starting the motor by manipulating the rheostat E, gradually bringing it up to the proper speed. The uniform winding of the wire upon the bobbin is governed by the feed bar 11 which travels with a reciprocating movement and actuated by the cam 15, so shaped as to translate rotative motion into uniform reciprocating linear motion. The cam is driven through the reduction gear train, driving from the spindle worm 18 to the shaft 16. The cam positively drives the feed bar in its forward or outward stroke, and a small coil spring 36 acts to move it through its return stroke. The spring is secured at one end to a hook 36ᵃ, the under side of the guide sleeve 9, and at its other end to a block 37 mounted on the guide rod and having a hooked finger 37ᵃ.

As the guide bar reciprocates, it manifestly feeds the wire back and forth across the face of the bobbin, the speed of rotation of the bobbin and the speed of the guide-bar being so related as to wind the wire evenly and smoothly in superimposed layers. The winding is assisted by the feed rollers D which not only guide the wire direct to the guide-bar 13, but imposes a uniform tension on the wire. The guide bar 13 is adjustable lengthwise in order to compensate for any variations in the dimensions of the bobbins, and to insure accurate feeding of the wire within the limits of the winding space of the bobbin.

The mechanism for guaging the turns, together with means for automatically stopping the machine when each bobbin is wound with a predetermined number of turns, will now be described.

The turn indicating device is the disc 28, and the gear train through which it is driven determines the relative speed of the cam and the spindle, the former in turn determining the speed of the reciprocating guide bar so that during each stroke a single layer of wire is wound evenly onto the bobbin. Hence, knowing the number of turns which will be applied during each stroke or revolution of the cam shaft, it can be further determined the number of layers that will be applied during a complete revolution of the disc 28, the speed ratio between said disc and cam shaft being definite. For example, if each bobbin is to take 4000 turns of wire, the disc makes a complete revolution for every 4000 revolutions of the spindle 2. The final step in regulating the capacity of each bobbin is, therefore, to automatically stop the spindle when the bobbin is wound. This is accomplished by a brake mechanism arranged and operated as follows:

A lever arm 38 is pivotally mounted at its lower end to a stub shaft 39 extending from the driving end of the casing 1, and is curved at its lower portion so as to extend vertically to the rear of the pulley 6, and in the plane thereof. The upper end of the lever forms a handle. Above the pivoted end of the lever is secured a coil spring 40 which is fixed to the casing and acts to draw the lever toward the pulley. Fixed to the lever above the spring is a brake shoe 41 adapted to frictionally engage the pulley, the tension of the spring being sufficient to effect a stoppage of the spindle 2, providing the lever 38 is released, and the shoe 41 brought against the brake pulley 6.

During the winding of the bobbin the brake lever is held free from the pulley as shown in Figure 3, the following arrangement being used. Secured to the inner side of the brake lever is a flat bar 42 in the nature of a leaf spring. The lower end is fixed to the lever and its upper end stands a short distance from the side of the lever. Moreover, the top edge of the bar in extended position bears against the under side of the disc 28 at the periphery thereof, and in the path of the lug or trip member 29 shown in Figure 8 as a short finger, radially located and pivoted at its inner end, thus being free to swing but limited in its movement by two pins 43—43. A small spring 44 is also attached to the trip member and acts to retain the same against the forward pin, (assuming the disc to be rotative in the direction of the arrow). As clearly shown in Figure 7, the upper end of the spring bar is beveled from front to rear and notched at its rear edge as at 42ᵃ.

In normal position of the brake lever, (Figure 3,) the bar bears against the under side of the disc and the contact holds the brake lever in non-operative position against the tension of the spring, this being a satisfactory arrangement, inasmuch as the disc rotates comparatively slowly, say, one revolution in two to three minutes. Now, assuming that the brake has been set, the trip finger approaches the spring bar from the direction of the arrow, as the bobbin nears the end of its winding capacity. As the end of the trip member strikes the bar 42, it flexes it outwardly beyond the periphery of the disc, thus releasing the brake lever and permitting it to be thrown forward into contact with the brake pulley 6. This stops the spindle from rotating and the operator then shuts off the motor, removes the bobbin, places an empty one in the machine, and then, before again starting the motor, resets the brake by pushing it back, which allows the bar 42 to spring under the disc as before. In the meantime, however, the trip finger has been thrown beyond the bar so that it does not act again until another complete revolution of the disc has been made.

In order to stop the spool spindle 31 at the same time, and thus prevent the wire form unwinding from the spool, an auxiliary brake lever 44 is mounted in a like manner to the side of spool spindle standard 30. A brake shoe 45 coacts with the spool spindle brake pulley 33. Connecting the two brake levers is a cord 46, thus when the forward or main brake lever is tripped, the spool brake lever acts simultaneously to stop the spool spindle.

Having described the machine embodying the invention, and the mode of operation thereof, I claim:

1. A winding machine comprising a spindle, a brake adapted to act on said spindle, tension means for holding said brake in braking position and means for normally holding said brake out of said braking position comprising a disc in driving connection with said spindle, a spring arm carried by said brake and normally positioned to frictionally engage said disc, and a trip member carried by said disc for displacing said spring arm from engagement with said disc to release said brake.

2. A winding machine comprising a rotative spindle adapted to support a bobbin, a brake pulley mounted on said spindle, a brake lever provided with a brake shoe adapted to engage said pulley, a rotative member driven by said spindle, a friction contact member carried by said brake lever and adapted for frictional contact with said rotative member to hold said lever in brake releasing position and a trip member carried by said rotative member to release said friction member from contact with said disc.

3. A winding machine comprising a rotative spindle adapted to support a bobbin, a brake pulley mounted on said spindle, a brake lever coacting with said pulley to stop said spindle, a spring acting to shift said lever into braking position, a disc in driving connection with said spindle through reduction gearing whereby said disc makes a complete revolution during the winding of a bobbin, a spring contact member mounted on said brake lever and positioned to frictionally engage said disc to hold said lever against the tension of said spring and a trip member carried by said disc for displacing said spring member from contact with said disc at the completion of each revolution thereof.

4. A winding machine comprising a bobbin spindle means for driving said spindle, a spool rack comprising a freely rotative spindle, a brake pulley mounted on each spindle, a brake lever associated with each brake pulley, means for connecting said brake levers, means for retaining the bobbin spindle brake lever in released position during the winding of a bobbin, and means for automatically shifting said last mentioned brake lever into braking position at the completion of the winding operation.

In witness whereof, I hereunto subscribe my name this 7th day of August, A. D. 1922.

WILLIAM O. MEISSNER.